(12) United States Patent
Kao

(10) Patent No.: US 12,442,163 B2
(45) Date of Patent: Oct. 14, 2025

(54) FAST SWITCH AND CORRESPONDING USE

(71) Applicant: Neoperl AG, Reinach (CH)

(72) Inventor: Chih-Hung Kao, New Taipeh (TW)

(73) Assignee: NEOPERL AG, Reinach (CH)

( * ) Notice: Subject to any disclaimer, the term of this patent is extended or adjusted under 35 U.S.C. 154(b) by 326 days.

(21) Appl. No.: 18/019,137

(22) PCT Filed: Aug. 9, 2021

(86) PCT No.: PCT/EP2021/072207
§ 371 (c)(1),
(2) Date: Feb. 1, 2023

(87) PCT Pub. No.: WO2022/037989
PCT Pub. Date: Feb. 24, 2022

(65) Prior Publication Data
US 2023/0287666 A1 Sep. 14, 2023

(30) Foreign Application Priority Data
Aug. 19, 2020 (TW) .................................. 109128301

(51) Int. Cl.
*E03C 1/04* (2006.01)
*F16K 7/16* (2006.01)
(Continued)

(52) U.S. Cl.
CPC .......... *E03C 1/0403* (2013.01); *E03C 1/0404* (2013.01); *E03C 1/0409* (2013.01);
(Continued)

(58) Field of Classification Search
CPC .... E03C 1/0403; E03C 1/0404; E03C 1/0409; F16K 7/16; F16K 27/0236; F16K 31/445;
(Continued)

(56) References Cited

U.S. PATENT DOCUMENTS 2,646,244 A * 7/1953 Sohn ....................... F16K 31/58
134/169 R
3,502,270 A * 3/1970 Prencipe ................... B05B 1/14
239/542

(Continued)

FOREIGN PATENT DOCUMENTS

CN 101569877 11/2009
CN 110953389 4/2020
(Continued)

*Primary Examiner* — John Bastianelli
(74) *Attorney, Agent, or Firm* — Volpe Koenig

(57) ABSTRACT

A fast switch for a sanitary device, which fast switch is designed to connect a water source and a water outlet apparatus, the fast switch includes a tube body with a water inlet end for connecting to the water source, a water outlet end to connect to the water outlet apparatus, with both being able to approach or move away from each other, and a pressing piece disposed on the water outlet end that moves therewith; and a valve body in the tube body which realizes at least two fluidic switching states between the water inlet and outlet ends. The valve body includes a switch element, and the pressing piece is able to press the switch element due to the mutual approaching of the water inlet and outlet ends, whereby the valve body is switched to selectively set one of the two fluidic switching states between the water inlet and outlet ends.

19 Claims, 16 Drawing Sheets

(51) Int. Cl.
   *F16K 27/02*   (2006.01)
   *F16K 31/44*   (2006.01)
   *F16K 31/56*   (2006.01)
   *F16K 31/60*   (2006.01)

(52) U.S. Cl.
   CPC ............ *F16K 7/16* (2013.01); *F16K 27/0236* (2013.01); *F16K 31/445* (2013.01); *F16K 31/56* (2013.01); *F16K 31/60* (2013.01)

(58) Field of Classification Search
   CPC . F16K 31/56; F16K 31/60; F16K 7/14; F16K 31/44
   USPC ........................................................ 251/353
   See application file for complete search history.

(56) References Cited

U.S. PATENT DOCUMENTS

| | | | |
|---|---|---|---|
| 3,618,892 A | 11/1971 | Sciuto, Jr. | |
| 6,643,864 B1 * | 11/2003 | Tse | ............ F16K 3/265 |
| | | | 4/615 |
| 9,061,298 B2 * | 6/2015 | Eley | ............ B05B 1/18 |

FOREIGN PATENT DOCUMENTS

| | | |
|---|---|---|
| DE | 1265515 | 4/1968 |
| JP | S57133671 U | 8/1982 |
| JP | S60116984 A | 6/1985 |
| TW | 479561 | 3/2002 |
| WO | 2005098150 | 10/2005 |

* cited by examiner

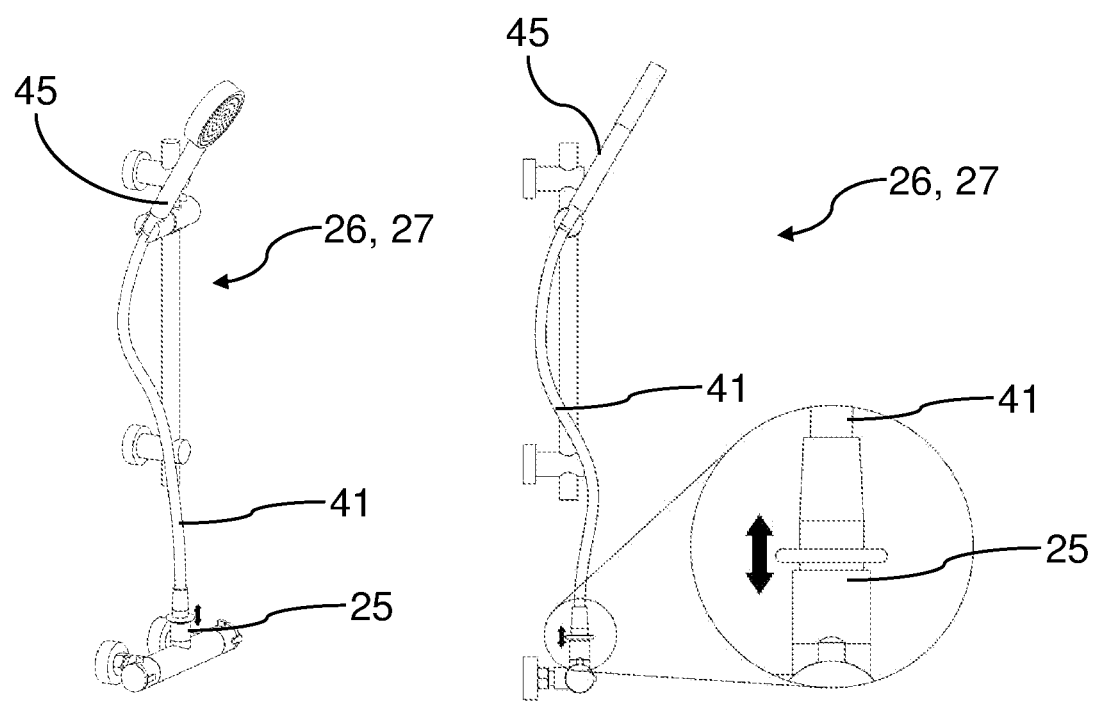
Fig. 21
Fig. 22
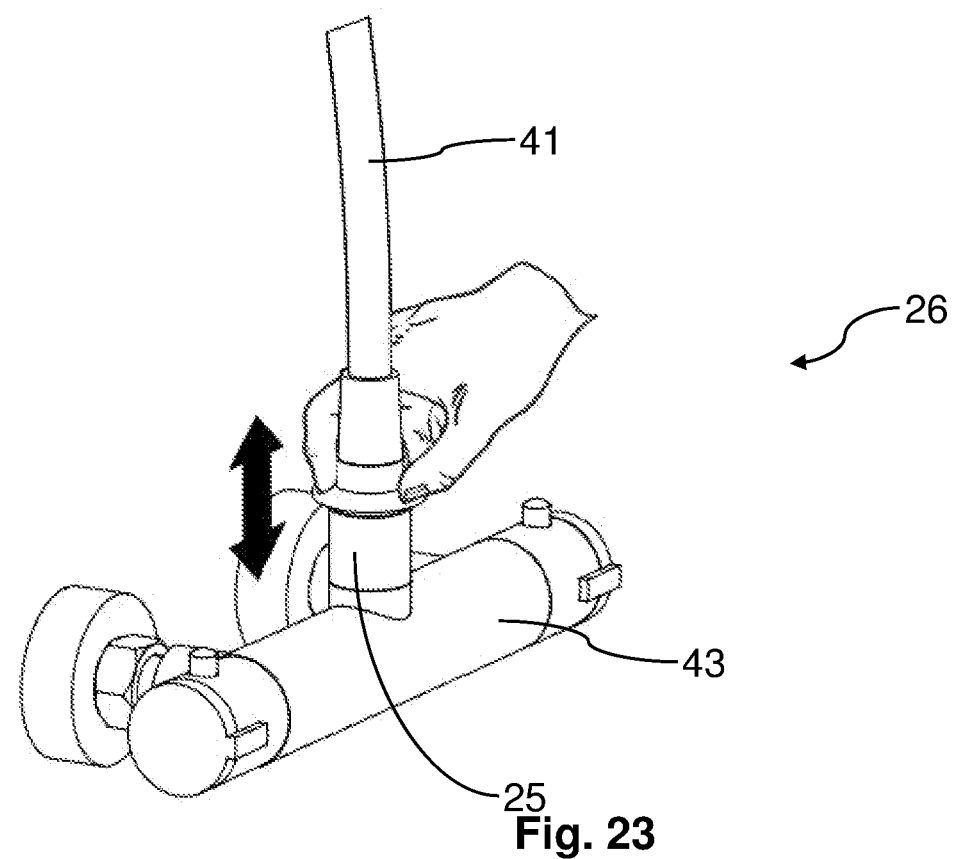
Fig. 23

FAST SWITCH AND CORRESPONDING USE

TECHNICAL FIELD

The present invention concerns a fast switch for a sanitary device.

BACKGROUND

To save water, many people use a shower to bathe. In the prior art, a sanitary device in the form of a shower device has a water outlet apparatus which in particular may be either a sprinkler head attached to the wall or a movable shower head in the form of a spray nozzle which can be used manually by a user. In addition, the shower device furthermore has a switch, which is usually arranged on the wall separately from the water outlet apparatus and may be used to control the water outlet apparatus, i.e. whether water is sprayed or not.

However, many people close their eyes during showering to avoid water getting into their eyes, which could cause eye irritation. Therefore, the user needs both hands to search for the switch position in order to open or close the water outlet apparatus, without being able to see the position of the switch. It is not only inconvenient to use but there is also the risk that the user can be scalded by accidentally touching a hot and cold water controller.

Sanitary devices are known for example in the form of shower devices, washbasins, tap fittings, baths and/or bathing devices.

SUMMARY

In view of the technical disadvantages and defects outlined above, the present invention provides a fast switch which can be arranged between a water outlet apparatus and a water pipe and can switch a flow of water. The user can thereby control the opening and/or closing and/or further switching states of the water outlet apparatus by moving the water outlet apparatus directly.

In order to achieve the above-mentioned object of the present invention, the technical measure of the present invention is to design a fast switch for a sanitary device which is configured to connect a water source and a water outlet apparatus, wherein the fast switch comprises:
  a tube body, comprising
  a water inlet end designed for connection to the water source,
  a water outlet end designed for connection to the water outlet apparatus, wherein the water outlet end and the water inlet end are able to approach or move away from one another,
  and a pressing piece which is arranged on the water outlet end and moves with the water outlet end;
  and a valve body which is arranged in the tube body and establishes at least two fluidic switching states between the water inlet end and the water outlet end, for example it can block or connect the water inlet end and the water outlet end, wherein the valve body comprises a switch element, wherein the pressing piece of the tube body can press the switch element of the valve body by the mutual approach of the water inlet end and the water outlet end, whereby the valve body is switched in order to selectively set one of the at least two fluidic switching states between the water inlet end and the water outlet end, in particular to block a connection between the water inlet end and the water outlet end or to connect the water inlet end and the water outlet end.

The advantage of the present invention is that the valve body is arranged in the tube body and can block or connect the water inlet end and the water outlet end of the tube body; that the water inlet end and water outlet end of the tube body can approach or move away from one another; and that the pressing piece is formed on the water outlet end such that when the water inlet end and water outlet end approach one another, the pressing piece can thereby press the switch element of the valve body and hence the valve body can block or connect the water inlet end and the water outlet end of the tube body. Thus the fast switch for a shower device of the present invention is connected between the water source (e.g. a water pipeline) and the water outlet apparatus (e.g. the sprinkler head), whereby the user can directly push the water outlet apparatus such that the water inlet end and water outlet end of the tube body approach one another. The water inlet end and water outlet end of the tube body are thereby blocked or connected, and again the flow of water from the water source to the water outlet apparatus can be controlled. In other words, by directly moving the water outlet apparatus, the user can control whether or not the shower device sprays water, so that even with closed eyes a fast switching can automatically be achieved, without the user having to search in the dark for the switch arranged on the wall or even accidentally touching the hot and cold water controller.

In an advantageous embodiment, it may be provided that a blocking fluidic switching state of the at least two fluidic switching states blocks a water flow between the water inlet end and the water outlet end. Thus a water flow can be switched off by pressing the water inlet end and/or water outlet end.

In an advantageous embodiment, it may be provided that a connecting fluidic switching state of the at least two fluidic switching states allows a water flow between the water inlet end and the water outlet end. Thus a fluidic connection can be created.

In an advantageous embodiment, it may be provided that a changeable balancing volume is formed downstream of the valve body. Thus a volume of water which is displaced during a switching process can be temporarily stored. Here it is favorable if the balancing volume fluidically communicates with the outlet end.

It may be provided that the balancing volume is at least as large as a water volume displaced on a change of switching state. Thus an obstruction of an actuating movement by incompressible water can be avoided.

It may also be provided that the balancing volume has a piston. Thus a changeable volume can easily be provided.

Here it may be provided that the piston is loaded with a return element. Thus an automatic evacuation of the balancing volume on pressure fall can be achieved.

Alternatively or additionally, it may be provided that the piston is open at the rear against ambient pressure, and/or is loaded with a compressible fluid. Thus a balancing movement or volume increase can be implemented on the basis of the above-mentioned displacement.

Furthermore, a fast switch for a sanitary device may be provided, wherein the tube body furthermore comprises: a first pipe, wherein the water inlet end is formed at one end of the first pipe and wherein the valve body is arranged in the first pipe; and a second pipe, wherein the water outlet end is formed at one end of the second pipe and wherein the second pipe is placed movably about the first pipe, so that the water outlet end and the water inlet end can approach or move away from one another.

Furthermore, the fast switch for a sanitary device may be provided, wherein an outer wall of the first pipe comprises a first contact face which faces the water outlet end; wherein an inner wall of the second pipe comprises a second contact face which faces the water inlet end; and wherein the tube body furthermore comprises an elastic component which lies between the first contact face and the second contact face and tends to move the water inlet end and the water outlet end away from one another.

Furthermore, the fast switch for a sanitary device may be provided, wherein an outer wall of the first pipe has a step surface which faces the water inlet end; wherein an inner wall of the second pipe has an inner ring groove which is formed at the other end of the second pipe opposite the water outlet end; wherein the valve body furthermore comprises a stop element which is arranged in the inner ring groove and protrudes from the inner ring groove; and wherein the step surface lies selectively on a side face of the stop element so that the stop element can delimit a maximum distance between the water inlet end and the water outlet end.

Furthermore, the fast switch for a sanitary device may be provided, wherein an internal thread is formed on an inner wall surface of the water inlet end; and wherein an external thread is formed on an outer wall surface of the water outlet end.

Furthermore, the fast switch for a sanitary device may be provided, wherein the valve body furthermore comprises: a chamber base, comprising an outer chamber which is connected to the water inlet end, an inner chamber which is connected to the outer chamber, and a connecting channel which is connected to the inner chamber and to the water outlet end, wherein the water from the water source can only flow to the water outlet end successively through the water inlet end, the outer chamber, the inner chamber and the connecting channel; and a blocking element, which is flexible and lies selectively on the chamber base and blocks the outer chamber and the inner chamber, so that the valve body can block or connect the water inlet end and the water outlet end.

Furthermore, the fast switch for a sanitary device may be provided, wherein the valve body furthermore comprises
  a switching component, comprising: a closed state in which, when the switching component is in the closed state, the switching component presses against the blocking element so that the blocking element lies on the chamber base and blocks the outer chamber and the inner chamber; and an open state in which, when the switching component is in the open state, the switching component releases the blocking element so that the blocking element, by its own flexibility, can be separated from the chamber base, whereby the outer chamber and the inner chamber are connected, wherein the switch element of the valve body is connected to the switching component, and wherein, when the switch element is pressed by the pressing piece of the tube body, the switch element causes the switching component to be switched between the closed state and the open state.

In an advantageous embodiment, it may be provided that the switching component has a bi-stable mechanism.

In an advantageous embodiment, it may be provided that the switching component actuates a pilot valve of a pressure chamber.

To achieve the above object, alternatively or additionally, the features directed at use of a fast switch may be provided. In particular, to achieve the object, it is proposed that a fast switch according to the invention, in particular as described above and/or according to any of the claims directed at a fast switch, is used such that a low-pressure side is configured at the water outlet end. Thus a fast switch according to the invention may be used in the vicinity of water outlets, for example shower heads, also by retrofitting for an additional switching facility.

Alternatively or additionally, it may be provided that a flow limiter and/or a flow reducer and/or a shut-off valve is arranged downstream of the water outlet end. Thus a fast switch according to the invention may also be used in closed systems or in medium power portions. An application may be provided in which a fast switch according to the invention replaces or supplements a corner valve.

The invention is now described in more detail with reference to exemplary embodiments, but is not restricted to these exemplary embodiments. Further exemplary embodiments arise from combinations of features of individual or multiple protective claims, and/or with individual or multiple features of the exemplary embodiments.

BRIEF DESCRIPTION OF THE DRAWINGS

FIG. 21 shows a use according to the intervention of a fast switch according to the invention in a sanitary device, in a three-dimensional oblique view.

FIG. 22 shows a sanitary device from FIG. 21 in a side view and a detail enlargement.

FIG. 23 shows a further detail enlargement from FIG. 21.

DETAILED DESCRIPTION

The technical measures which serve to achieve the above-mentioned object of the present invention are explained in detail below in conjunction with the drawings and preferred exemplary embodiments.

Figure 1:
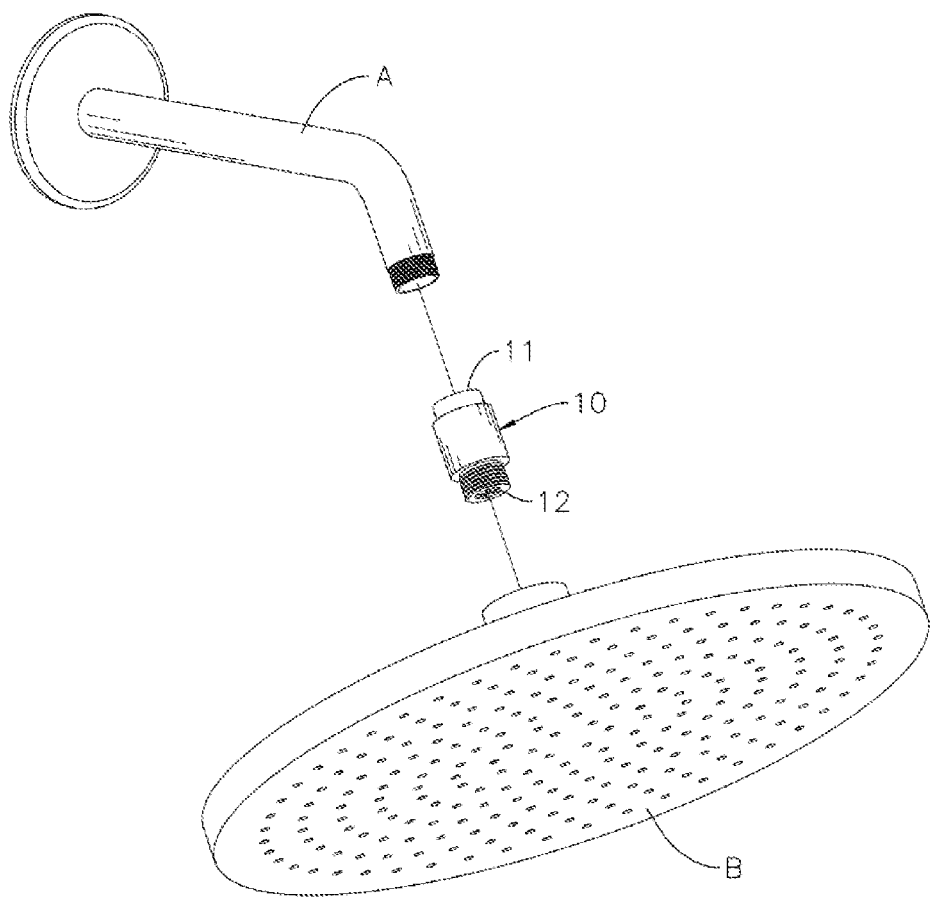
FIG. 1 shows a schematic view of the use of the present invention.
Figure 2:
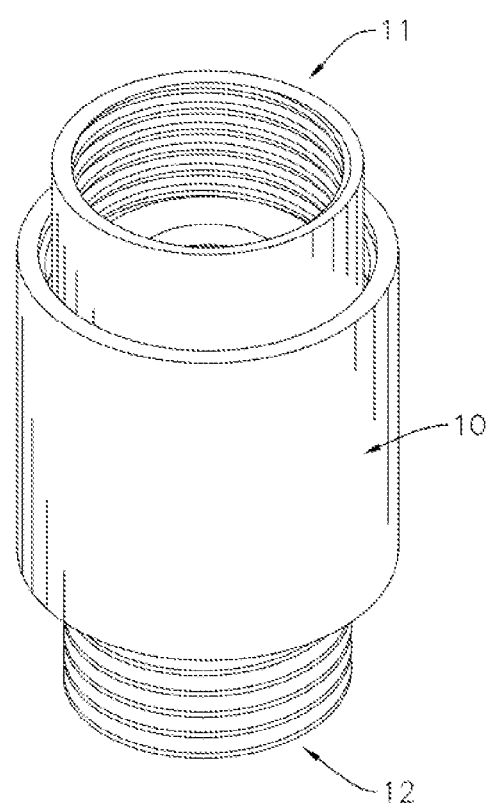
FIG. 2 shows a perspective view of the present invention.
Figure 3:
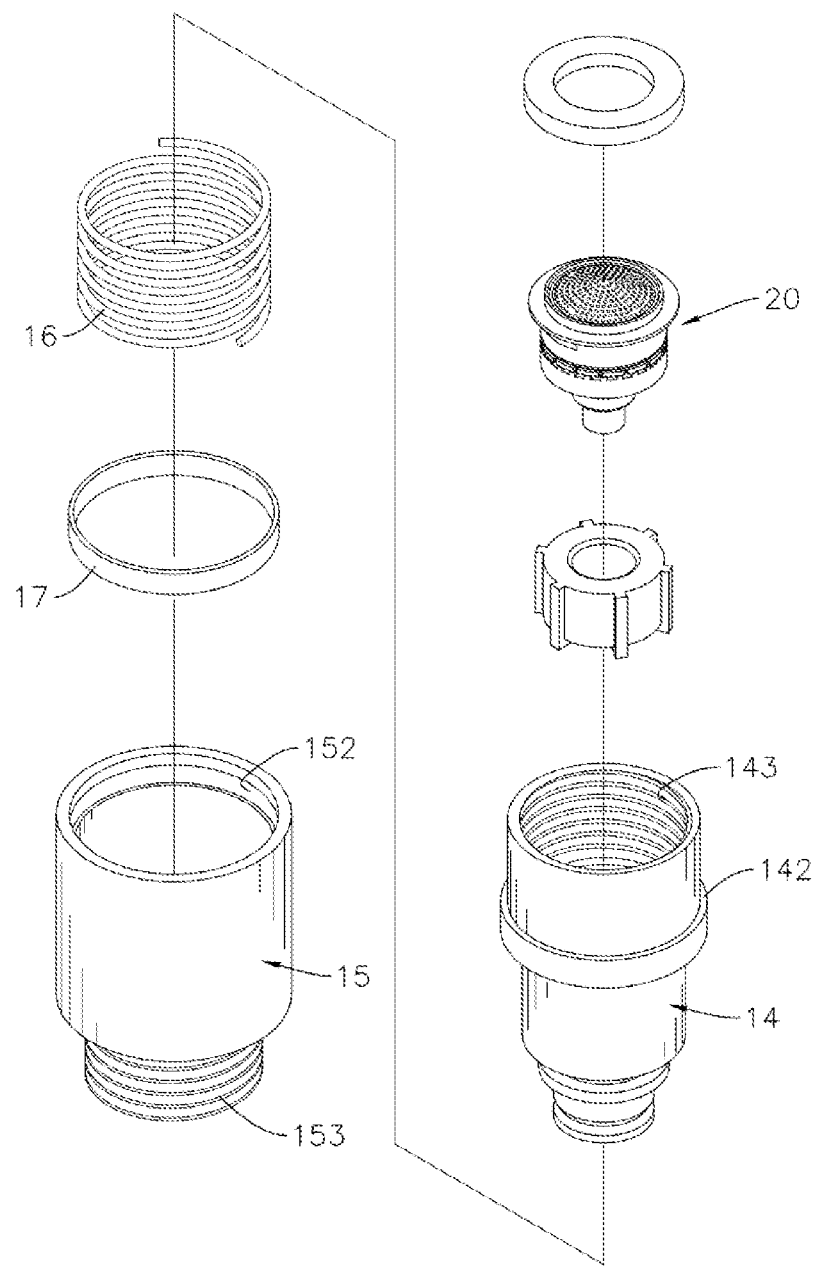
FIG. 3 shows an exploded view of components of the present invention.

With reference to FIGS. 1, 2 and 3, the fast switch for a shower device of the present invention serves to connect a water source A to a water outlet apparatus B, wherein the water source A in particular may be a water pipeline, and the water outlet apparatus B may be a sprinkler head or a shower head in the form of a spray nozzle. The fast switch for a shower device comprises a tube body 10 and a valve body 20.

Figure 6:
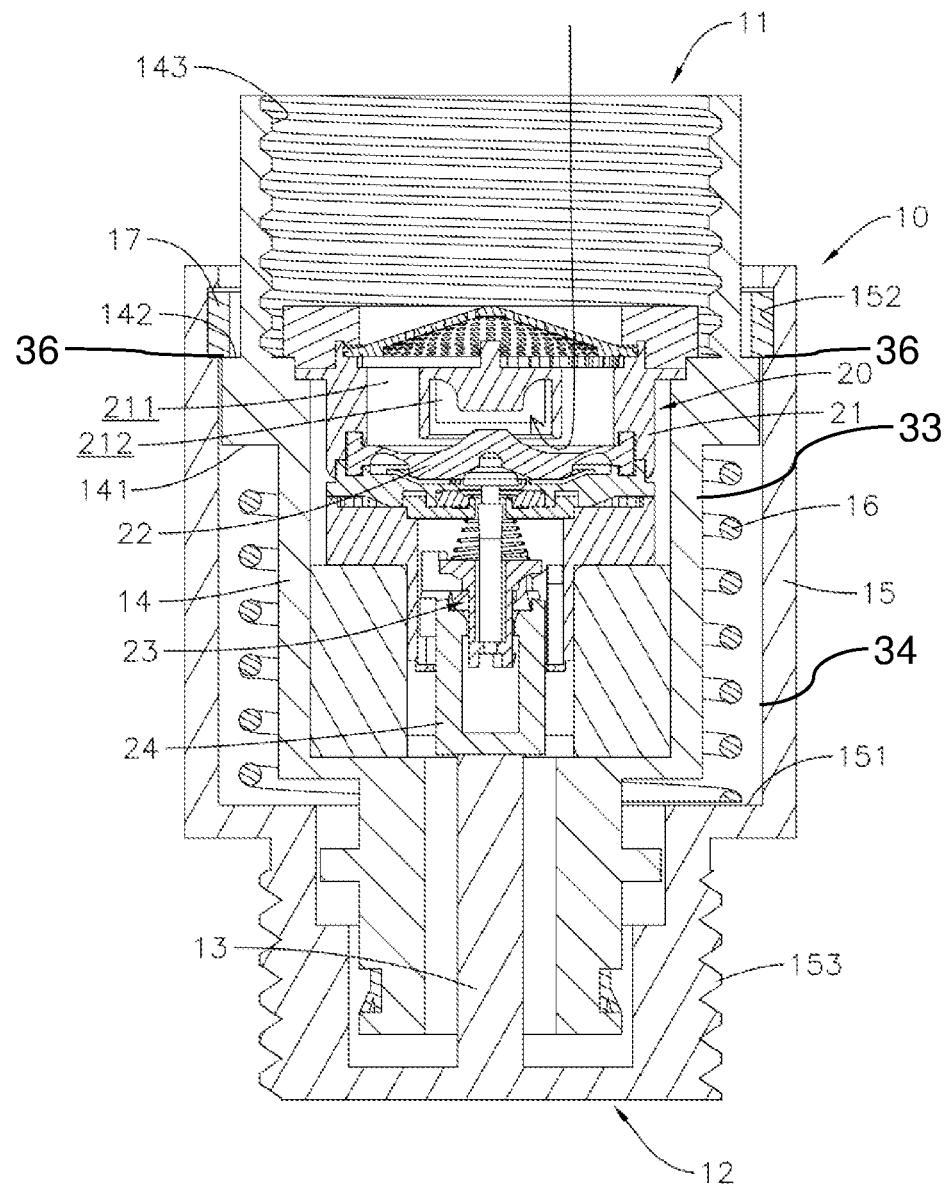
FIG. 6 shows a side sectional view of the present invention in open state.

With reference to FIGS. 3 and 6, the tube body 10 comprises a water inlet end 11, a water outlet end 12 and a pressing piece 13. The water inlet end 11 serves for connection to the water source A. The water outlet end 12 serves for connection to the water outlet apparatus B. The water outlet end 12 and the water inlet end 11 may approach or move away from one another. The pressing piece 13 is arranged on the water outlet end 12 and moves with the water outlet end 12. In concrete terms, in the present exemplary embodiment, the pressing piece 13 is a cylinder, wherein one end of the cylinder is connected via a plurality of connecting rods to a connection of the water outlet end 12, while the other end of the cylinder runs linearly in the direction of the water inlet end 11. However, the actual structure of the pressing piece 13 in further exemplary embodiments is not restricted thereto.

Furthermore, in the present exemplary embodiment, the tube body 10 also comprises a first pipe 14, a second pipe 15, an elastic component 16 and a stop element 17.

The water inlet end 11 is formed at one end of the first pipe 14 and the valve body 20 is arranged in the first pipe 14. An outer wall of the first pipe 14 comprises a first stop face 141 and a step surface 142. The first stop face 141 faces the water outlet end 12. The step surface 142 faces the water inlet end 11.

The water outlet end 12 is formed at one end of the second pipe 15. The second pipe 15 is placed movably about the first pipe 14 so that the water outlet end 12 and water inlet end 11 can approach or move away from one another. An inner wall of the second pipe 15 comprises a second contact face 151 and an inner ring groove 152. The second contact face 151 faces the water inlet end 11. The inner ring groove 152 is arranged on the other end of the second pipe 15 opposite the water outlet end 12. In concrete terms, the second contact face 151 is closer to the water outlet end 12 than the inner ring groove 152.

The elastic component 16 lies between the first contact face 141 and the second contact face 151, and tends to move the water inlet end 11 and water outlet end 12 away from one another. The elastic component 16 allows a stable connection between the first pipe 14 and the second pipe 15.

The stop element 17 is arranged in the inner ring groove 152 and protrudes from the inner ring groove 152. The step surface 142 lies selectively on a side face of the stop element 17, so that the stop element 17 can delimit a maximum distance between the water inlet end 11 and the water outlet end 12. In other words, the stop element 17 can ensure that the first pipe 14 cannot be separated from the second pipe 15 when the water inlet end 11 and water outlet end 12 move away from one another. In other words, the second pipe 15 still lies on the stop element 17 and on the step surface 142, and is stable in the first pipe 14 without being separated even when the elastic component 16 moves the first pipe 14 and second pipe 15 away from one another. In concrete terms, in the present exemplary embodiment, the stop element 17 is a ring body. However, in further exemplary embodiments, it is not restricted thereto.

In addition, in the present exemplary embodiment, an internal thread 143 is provided on an inner wall surface of the water inlet end 11, and an external thread 153 is formed on an outer wall surface of the water outlet end 12, whereby the connection to the water source A and to the water outlet apparatus B can be simplified. In further exemplary embodiments, there may also be no internal thread 143 and external thread 153, but instead the water source A and the water outlet apparatus B are connected by further structures.

Also, in the present exemplary embodiment, by the relative movement of the first pipe 14 and second pipe 15 towards one another, the tube body 10 causes the water inlet end 11 and water outlet end 12 to approach or move away from one another. It is however not restricted thereto in further exemplary embodiments. For example, the tube body 10 may also be a rubber tube in which a middle part of the tube body 10 simultaneously deforms radially outward on compression, and protrudes outward so that the two ends can approach or move away from one another. Alternatively, the tube body 10 may also be a structure similar to a stretched and curved drinking straw, i.e. with a plurality of annular folds on the pipe wall, whereby the two ends can also approach or move away from one another.

Figure 4:
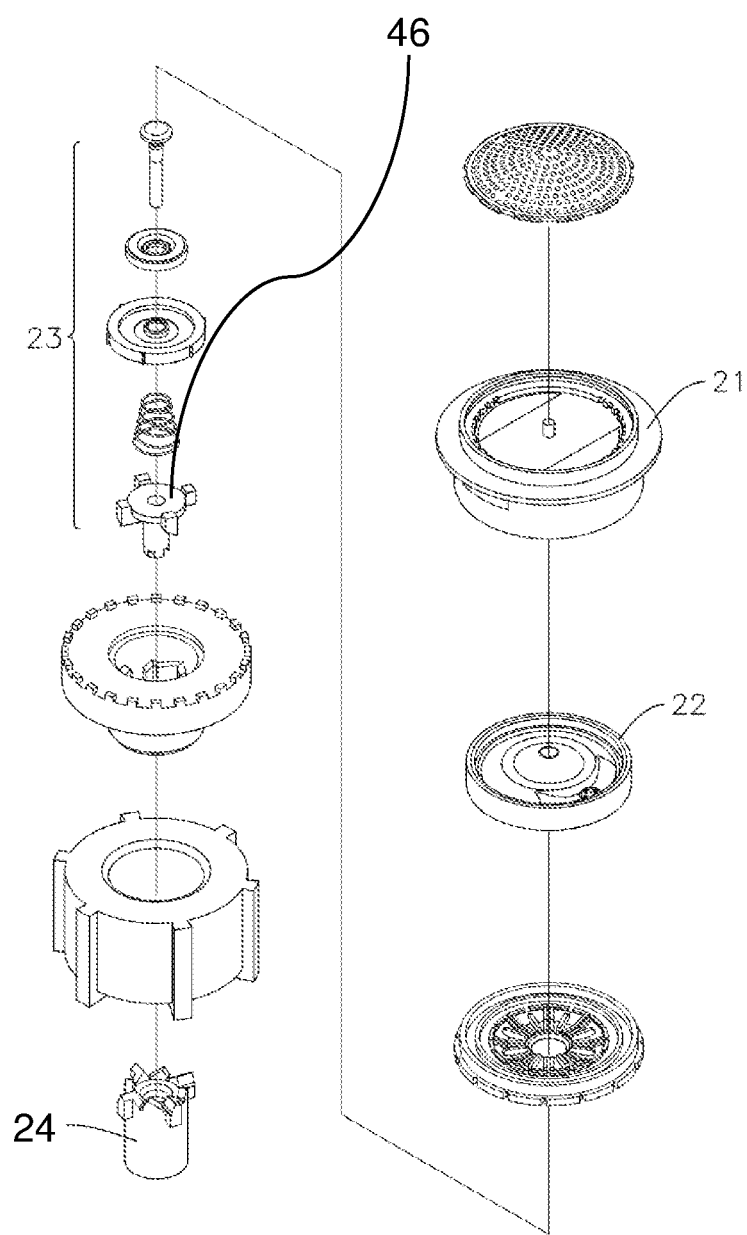
FIG. 4 shows an exploded view of components of a valve body of the present invention.
Figure 5:
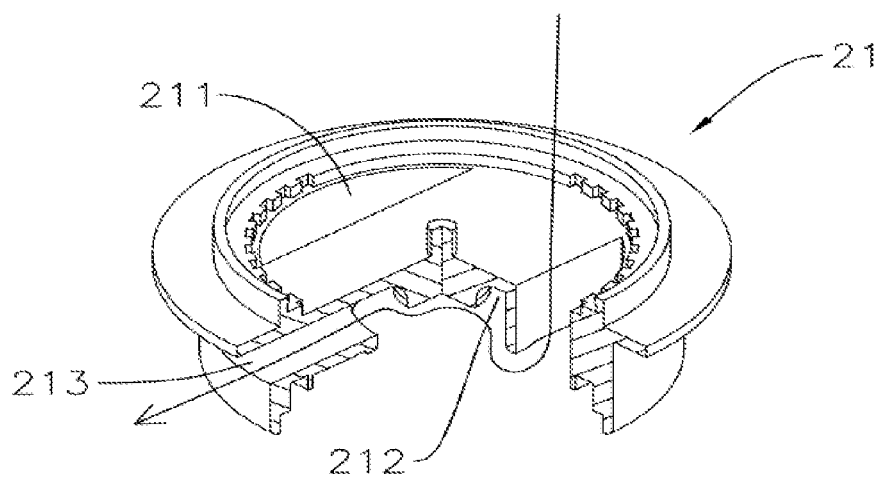
FIG. 5 shows a perspective sectional view of a chamber base of the present invention.

With further reference to FIGS. 4 and 5, the valve body 20 is arranged in the tube body 10 and can block or connect the water inlet end 11 and water outlet end 12. The valve body 20 comprises a chamber base 21, a blocking element 22, a switching component 23 and a switch element 24.

The chamber base 21 comprises an outer chamber 211, an inner chamber 212 and a connecting channel 213. The outer chamber 211 is connected to the water inlet end 11. The inner chamber 212 is connected to the outer chamber 211. The connecting channel 213 is connected to the inner chamber 212 and to the water outlet end 12. The water from the water source A can only flow to the water outlet end 12 successively through the water inlet end 11, the outer chamber 211, the inner chamber 212 and the connecting channel 213.

The blocking element 22 is flexible and lies selectively on the chamber base 21 and blocks the outer chamber 211 and the inner chamber 212, so that the valve body 20 can block or connect the water inlet end 11 and water outlet end 12.

The switching component 23 comprises a closed state and an open state. When the switching component 23 is in the closed state, the switching component 23 presses against the blocking element 22 so that the blocking element 22 lies on the chamber base 21 and blocks the outer chamber 211 and inner chamber 212. When the switching component 23 is in the open state, the switching component 23 releases the blocking element 22 so that, by its own flexibility, the blocking element 22 can be separated from the chamber base 21, whereby the outer chamber 211 and the inner chamber 212 are connected.

The switch element 24 is connected to the switching component 23. The pressing piece 13 of the tube body 10 can press the switch element 24 of the valve body 20 by the mutual approach of the water inlet end 11 and water outlet end 12, and thereby the valve body 20 is switched to block the water inlet end 11 water outlet end 12 or connect the water inlet end 11 and water outlet end 12. In other words, the switch element 24 causes the switching component 23 to switch between the closed state and the open state when the switch element 24 is pressed by the pressing piece 13 of the tube body 10.

Figure 7:
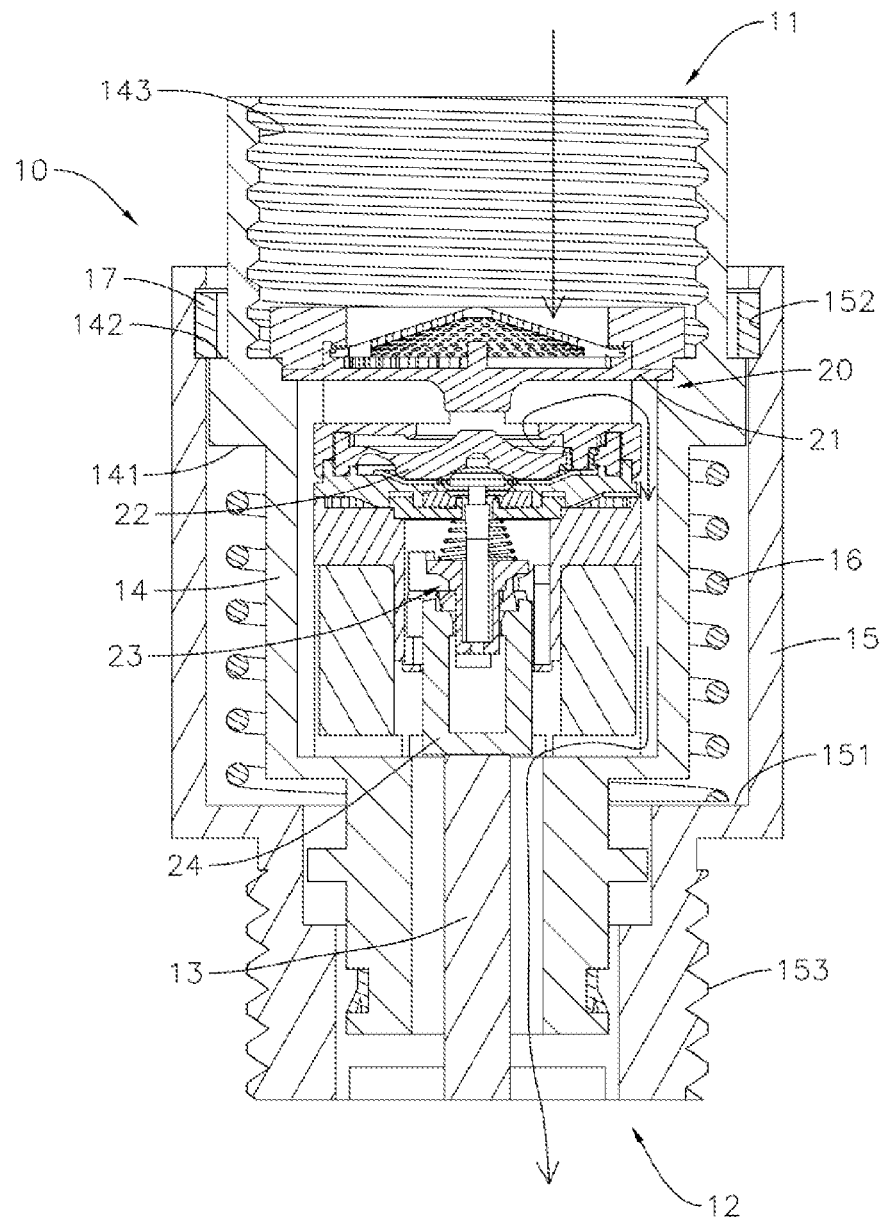
FIG. 7 shows a further side sectional view of the present invention in open state.
Figure 8:
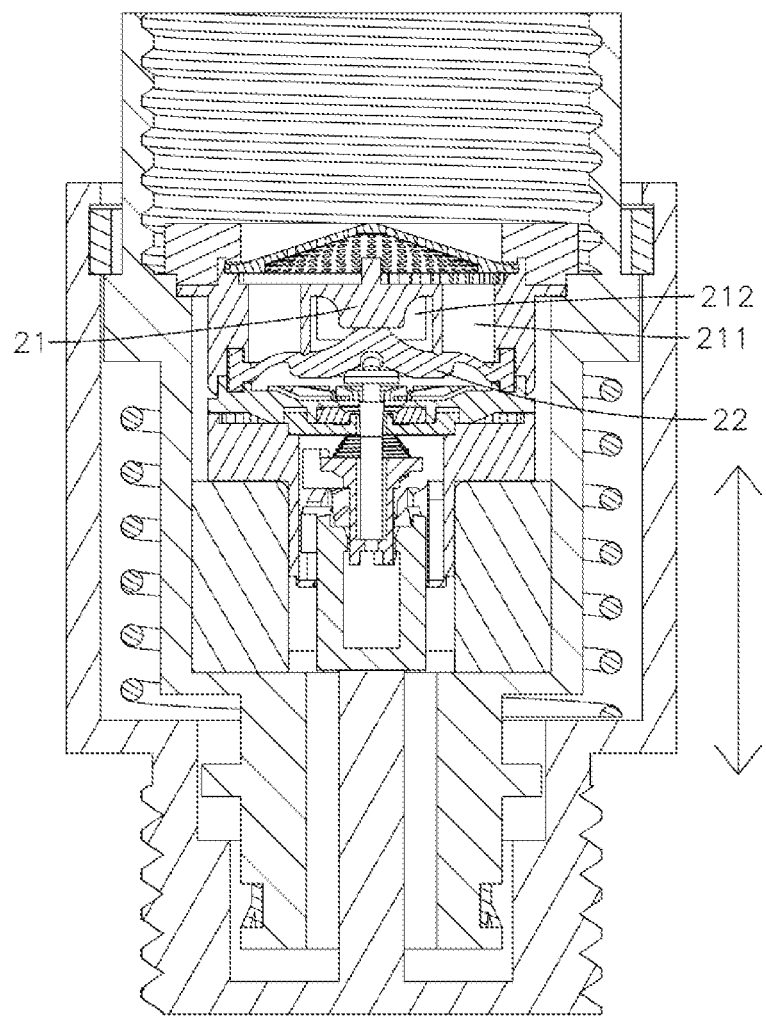
FIG. 8 shows a side sectional view of the present invention in closed state.
Figure 9:
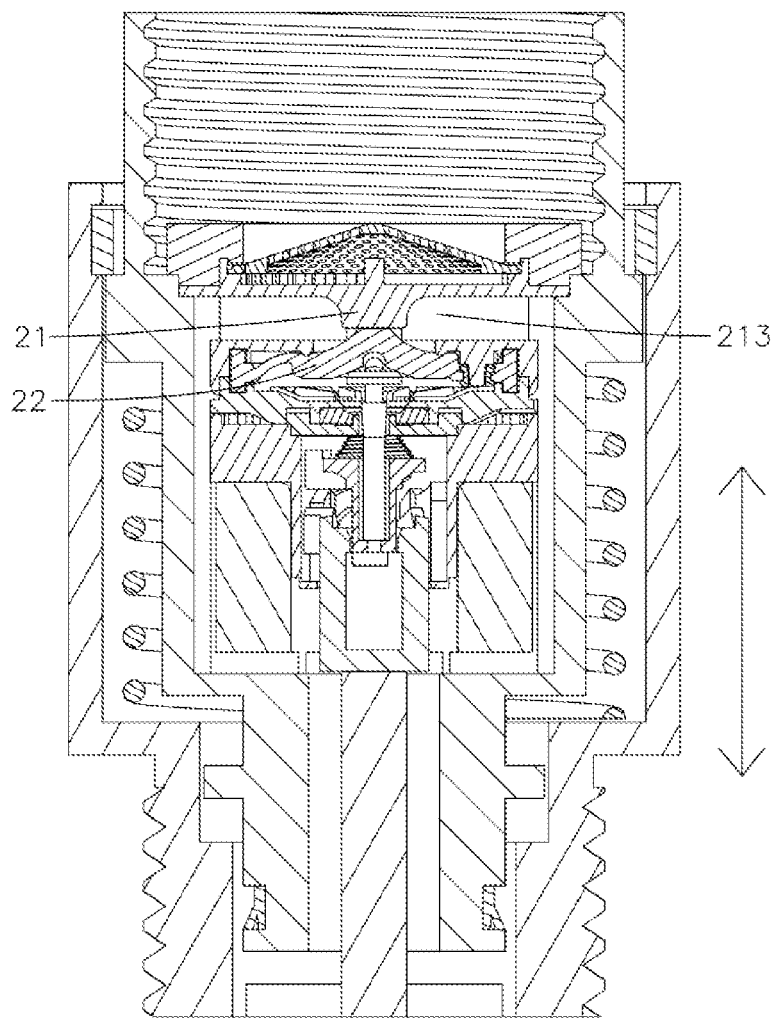
FIG. 9 shows a further side sectional view of the present invention in closed state.

Still with reference to FIGS. 1, 5 and 6 to 9, during use, the present invention is arranged between the water source A and the water outlet end B. The user need merely push the water outlet apparatus B in order to bring the water inlet end 11 and water outlet end 12 closer together, so that the pressing piece 13 presses the switch element 24 of the valve body 20 and hence the valve body 20 is opened or closed. When the switching component 23 of the valve body 20 is in the open state, as shown in FIGS. 6 and 7 (FIG. 6 and FIG. 7 are sectional views from different sides in the same state, wherein the sections of the two Figures are vertical), the switching component 23 releases the blocking element 22 so that, by its own flexibility, the blocking element 22 can be separated from the chamber base 21, whereby the outer chamber 211 and the inner chamber 212 are connected. Thus water can flow to the water outlet end 12 successively through the water inlet end 11, the outer chamber 211, the inner chamber 212 and the connecting channel 213. In this way, the water can flow from the water source A through the present invention to the water outlet end B for spraying. When the switching component 23 of the valve body 20 is in the closed state, as shown in FIGS. 8 and 9 (FIG. 8 and FIG. 9 are sectional views from different sides in the same state, wherein the sections of the two Figures are vertical), the switching component 23 presses against the blocking element 22 so that the blocking element 22 lies on the chamber base 21 and blocks the outer chamber 211 and in the chamber 212. Thus the water can flow only via the water inlet end 11 to the outer chamber 211, i.e. the water is blocked by the blocking element 23 and hence the water outlet apparatus B no longer sprays the water.

The advantage of the present invention is that the valve body 20 is arranged in the tube body 10, and can block or connect the water inlet end 11 and water outlet end 12 of the tube body 10; the water inlet end 11 and water outlet end 12 of the tube body 10 can approach or move away from one another; and the pressing piece 13 is formed on the water outlet end 12 so that, when the water inlet end 11 and water outlet end 12 approach one another, the pressing piece can thereby press the switch element 12 of the valve body 20, and hence the valve body 20 can block or connect the water inlet end 11 and water outlet end 12 of the tube body 10. Thus the fast switch for a shower device of the present invention is connected between the water source A (e.g. a water pipeline) and the water outlet apparatus B (e.g. the sprinkler head), whereby the user can directly push the water outlet apparatus B such that the water inlet end 11 and water outlet end 12 of the tube body 10 approach one another. Thus the water inlet end 11 and water outlet end 12 of the tube body 10 are blocked or connected, and again it can be controlled whether the water from the water source A flows through the present invention to the water outlet apparatus B. In other words, by directly pushing the water outlet apparatus B, the user can control whether or not the shower device sprays water, so that even with closed eyes, he can achieve a fast switching without having to search in the dark for a switch arranged on the wall or even accidentally touching the hot and cold water controller.

Figure 10:
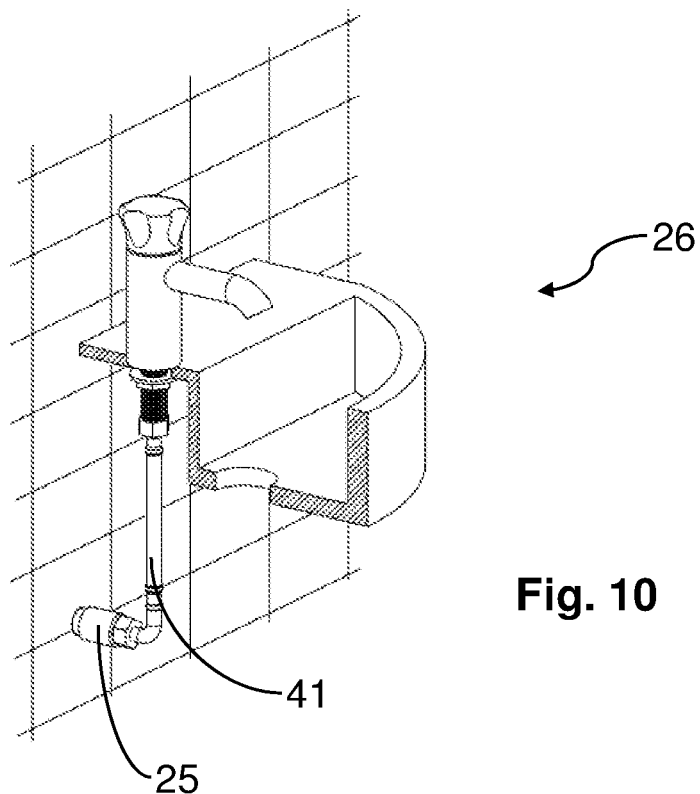
FIG. 10 shows a use according to the invention of a fast switch according to the invention in a closed supply line for a washbasin fitting, in a partially cutaway illustration.
Figure 11:
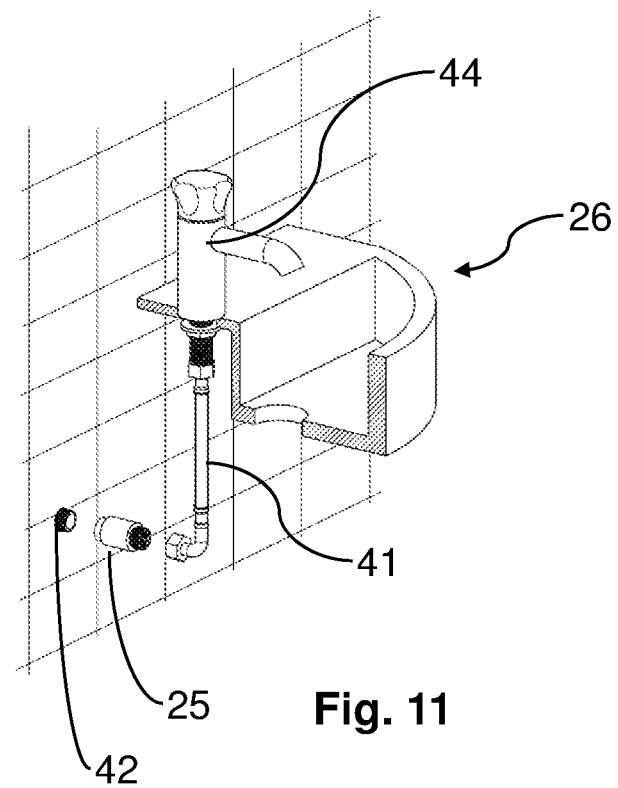
FIG. 11 shows the use according to FIG. 10 in a partially dismantled position.

FIGS. 10 and 11 show different illustrations of a use according to the invention of a fast switch 25 according to the invention on a sanitary device 26, here in the form of a washbasin with a washbasin fitting 44.

The fast switch 25 is screwed into a wall connection 42 instead of a corner valve. A water pipeline 41 is connected to the fast switch 25 and leads to the washbasin fitting 44.

By pressing on the water pipeline 41 from the outside, the fast switch 25 can be opened and closed.

Figure 12:
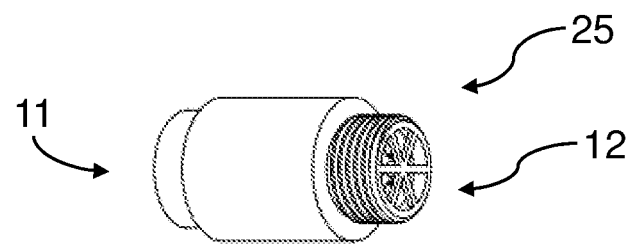
FIG. 12 shows the fast switch from FIG. 10 individually.

FIG. 12 shows a detailed illustration of the fast switch 25 according to the invention from FIGS. 10 and 11.

The fast switch 25 connects a water inlet end 11 to a water outlet end 12.

Figure 13:
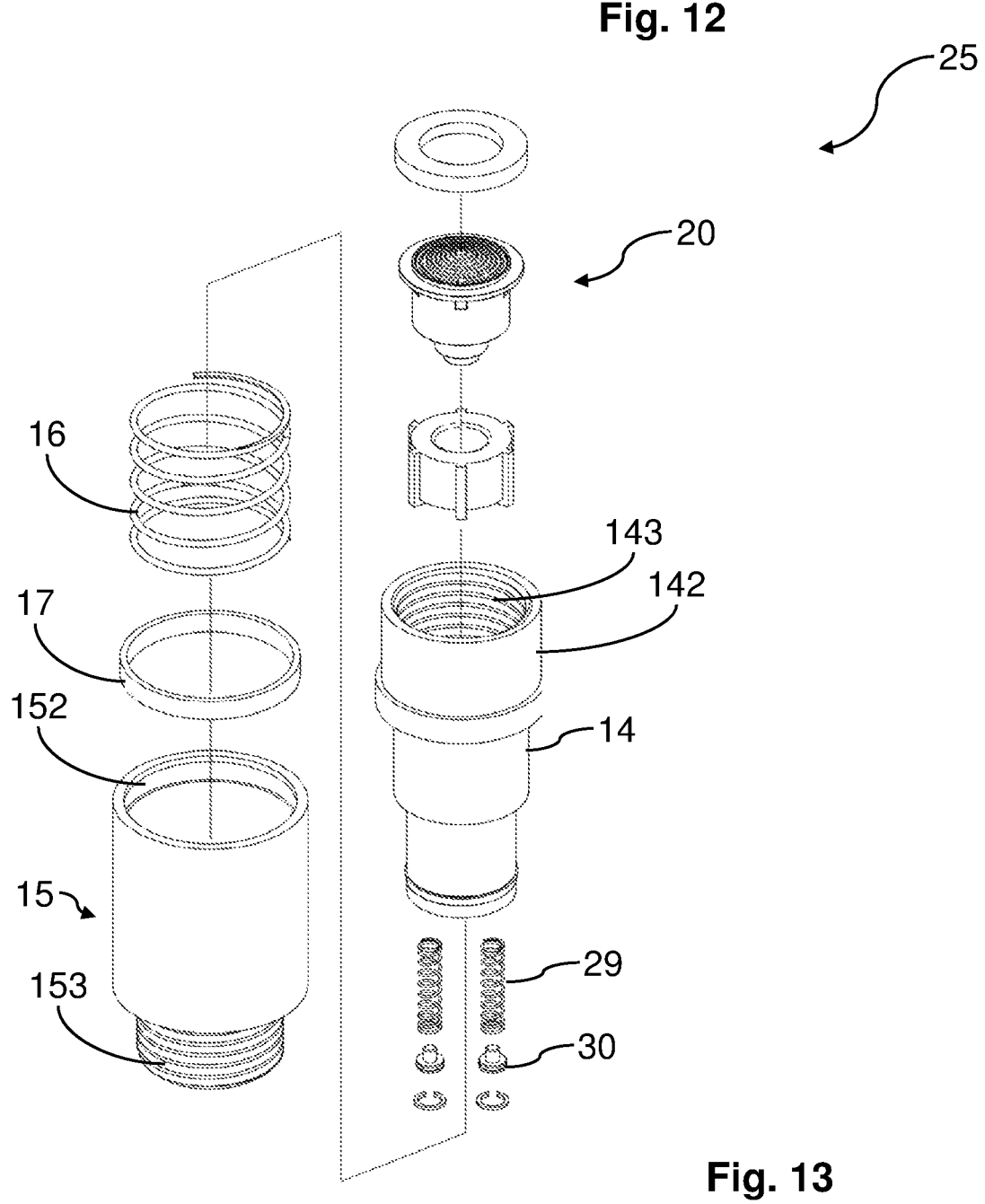
FIG. 13 shows the fast switch from FIG. 12 in an exploded view.

FIG. 13 shows a detail illustration of the exploded view of the fast switch 25.

Components and function units which are functionally and/or structurally similar or identical to the preceding exemplary embodiments carry the same reference signs and are not described separately again.

Figure 14:
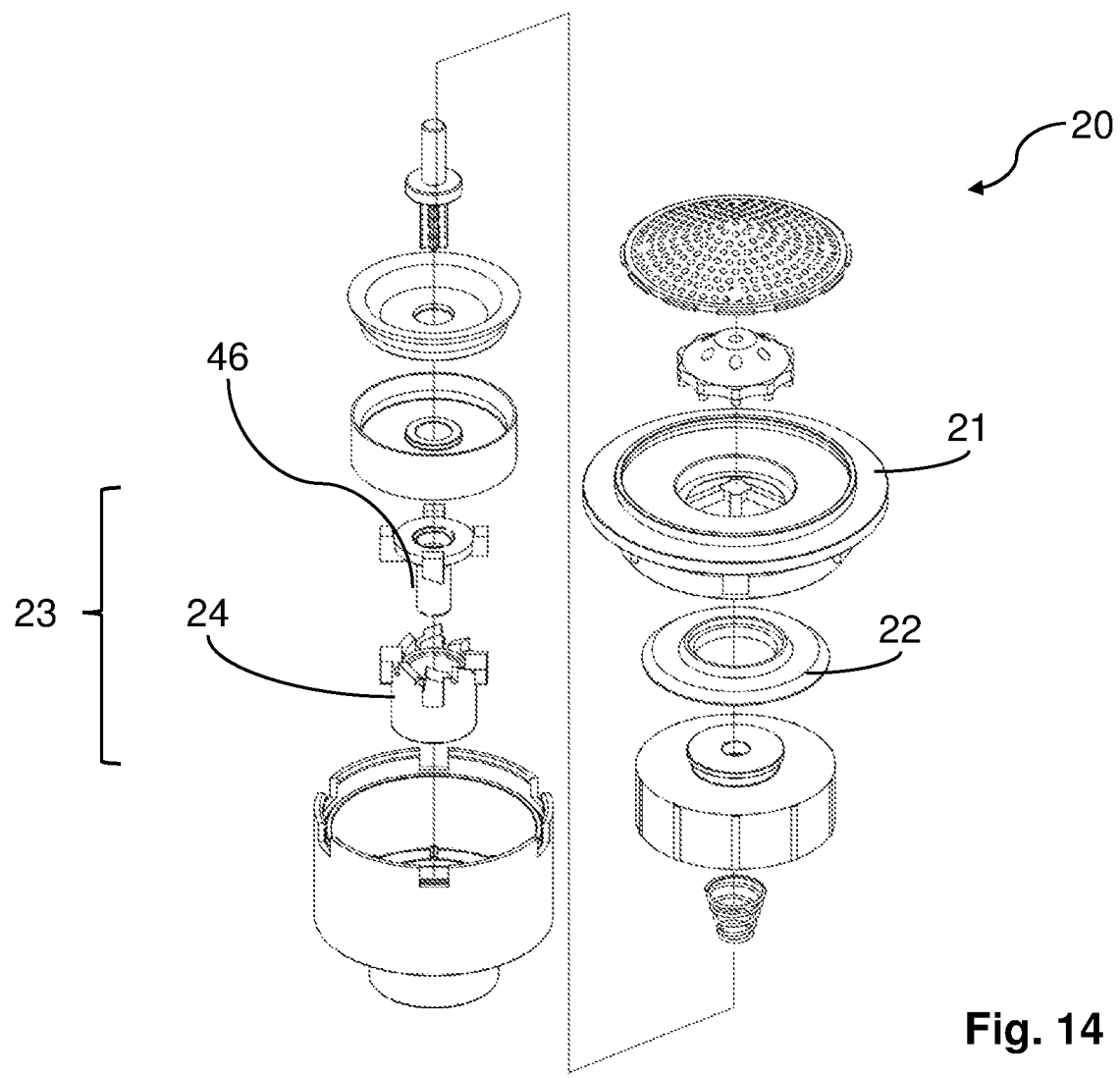
FIG. 14 shows an exploded view of a valve body from FIG. 13.

FIG. 14 shows an exploded view of the valve body designated 20 as a whole in FIG. 13.

FIGS. 15 to 20 serve to explain the function of the fast switch 25.

Components and function units which are functionally and/or structurally similar or identical carry the same reference signs and are not described separately again.

The statements concerning FIGS. 1 to 9 therefore apply accordingly to FIGS. 10 to 20.

Figure 15:
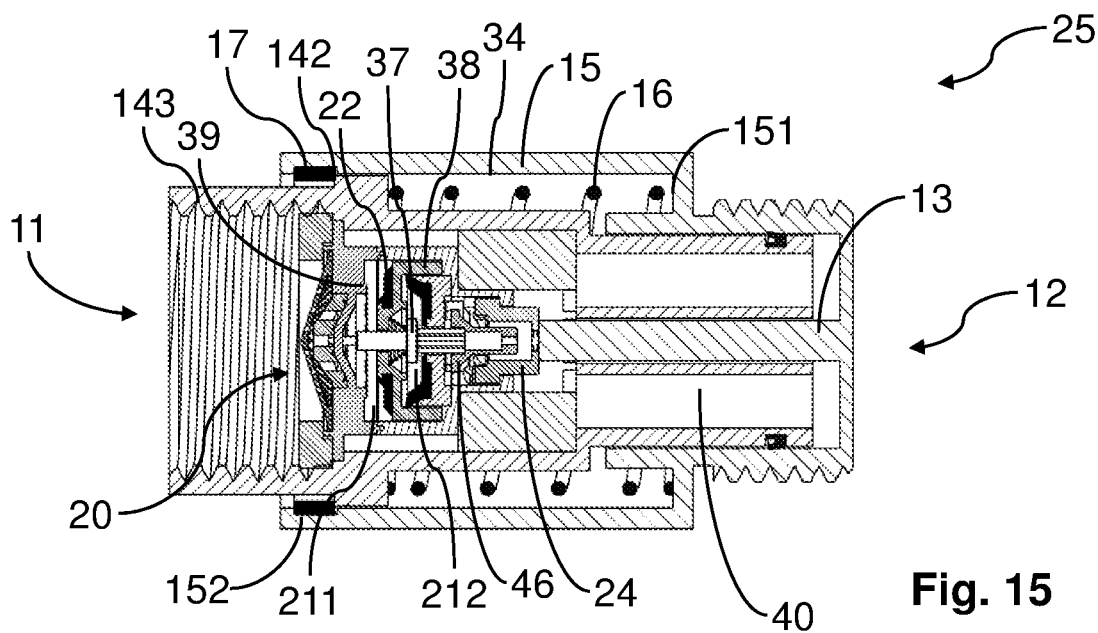
FIG. 15 shows a first axial section through a fast switch from FIG. 12.

FIG. 15 shows an axial section through the fast switch 25.

It shows the switch position in which the valve body 20 is open.

In this switch position, water can run from the water inlet end 11 via the outlet 40 to the water outlet end 12.

Figure 16:
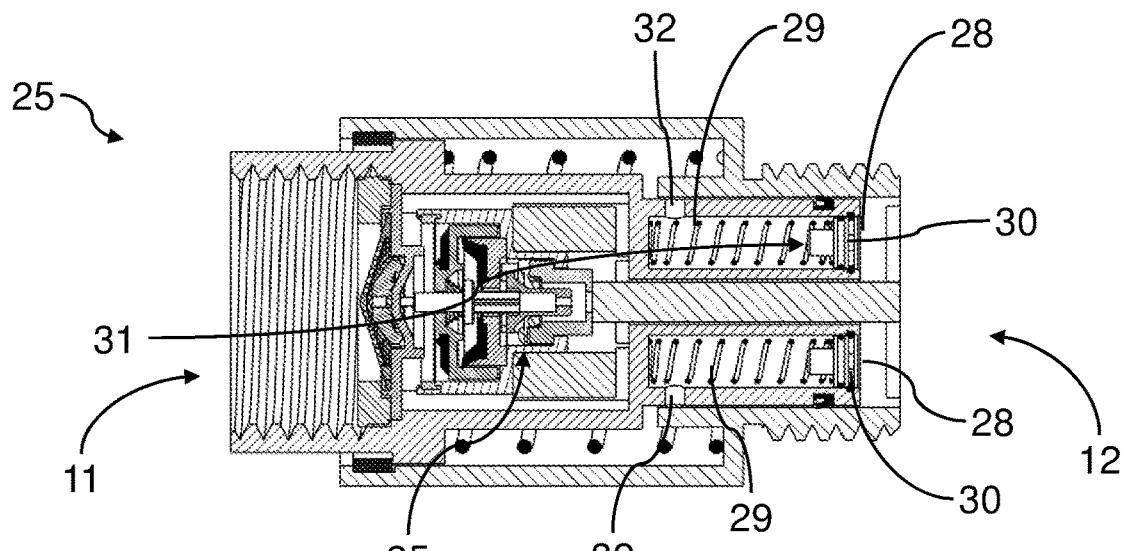
FIG. 16 shows a second axial section, rotated by 90° relative to FIG. 15, through the fast switch from FIG. 12.
Figure 17:
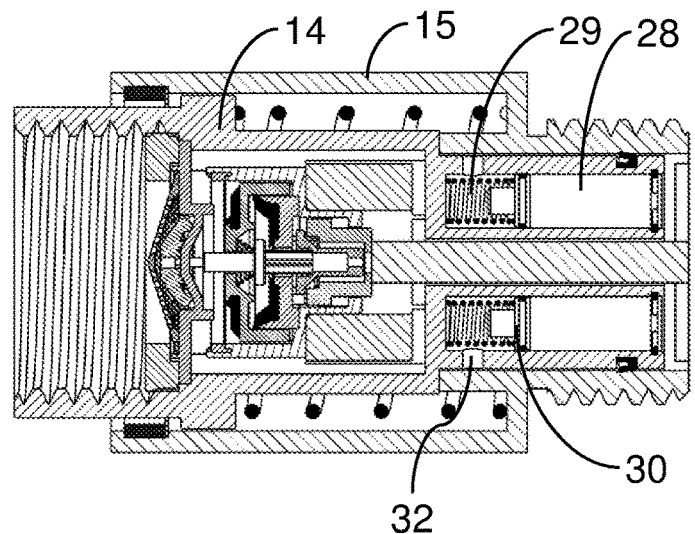
FIG. 17 shows the fast switch from FIG. 16 in a first actuating step.
Figure 18:
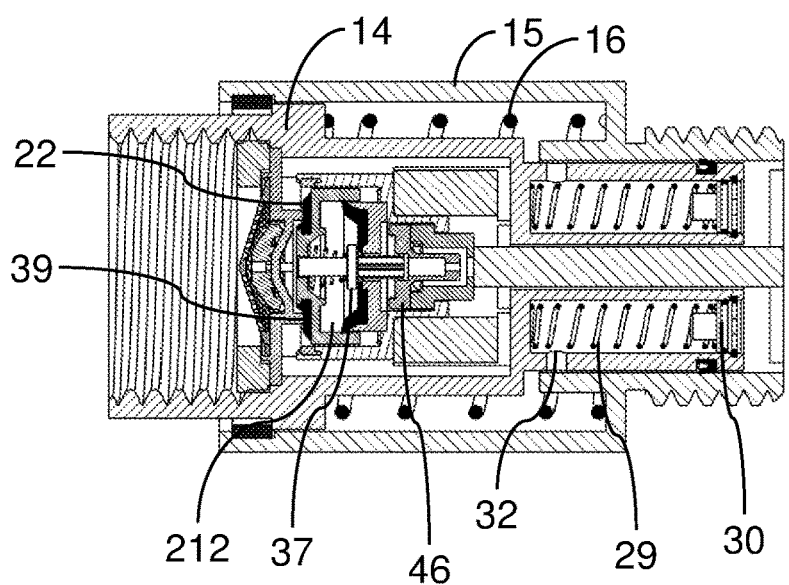
FIG. 18 shows the fast switch from FIG. 17 after the end of the actuating step.

FIG. 16 shows an axial section which is rotated by 90° relative to FIG. 15 about a longitudinal axis of the fast switch 25.

The exemplary embodiment in FIGS. 10-20 differs from the preceding fast switch 25 by a balancing volume 28, which is described in more detail below.

In FIG. 16, the balancing volume 28, which is delimited by a piston 30, is minimal.

If now the first pipe 14 is moved relative to the second pipe 15 (see FIG. 17), water is displaced on the downstream side of the valve body 20.

If the water outlet end 12 is not pressure-free, water is displaced into the balancing volume 28. Here, the piston 30 is moved against the return force of the return elements 29. The return elements 29 are arranged in atmospheric pressure.

The rear side 31 of the piston 30 may be pressure-relieved via vent openings 32, since the vent openings 32 open into the ambient air or atmosphere.

This actuation movement leads to a switching of the bi-stable mechanism 35. More precisely, the counter-switch element 46 here rotates by 45° about the longitudinal axis of the fast switch 25. This closes the pilot valve 37 so that a pressure can build up in the inner chamber 212. This pressure build-up moves the inner chamber wall 38 (see FIG. 18) so that the blocking element 22 is pressed against the valve seat 39.

The valve body 20 is thus closed and no water can flow from the water inlet end 11 to the water outlet end 12.

Figure 19:
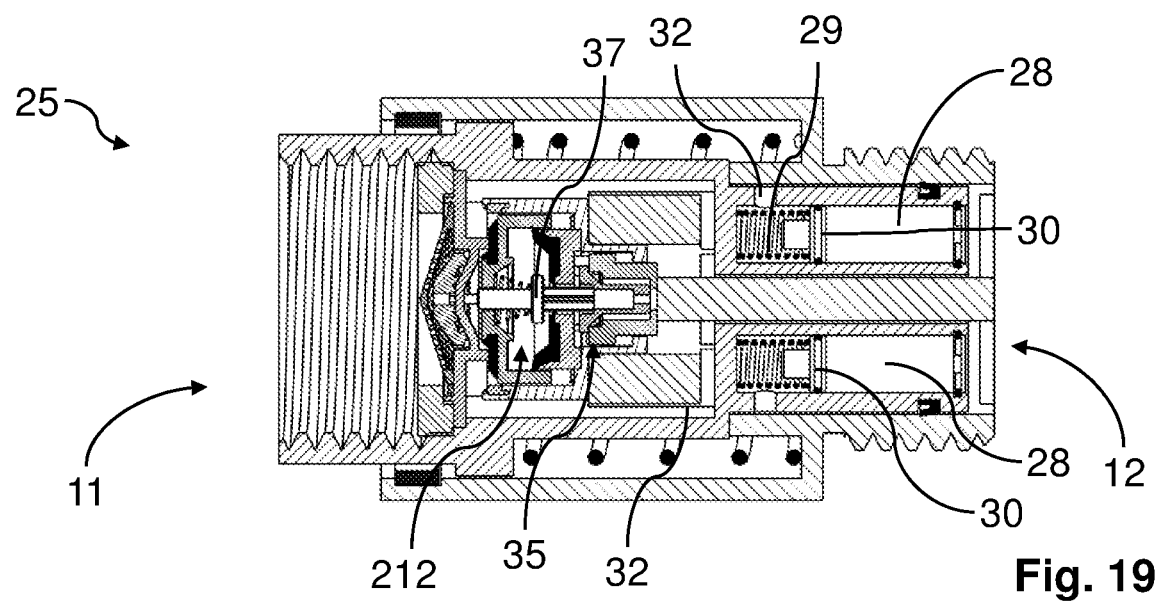
FIG. 19 shows the fast switch in FIG. 18 in a second actuating step.

If now the first pipe 14 is again moved relative to the second pipe 15, the counter-switch element 46 of the bi-stable mechanism 35 again rotates through 45° (see FIG. 19).

This leads to an opening of the pilot valve 37 so that the inner chamber 212 is evacuated.

This leads to the inner chamber wall 38 being moved by the operating pressure on the water inlet end 11, so that the inner chamber 212 reduces in size.

Figure 20:
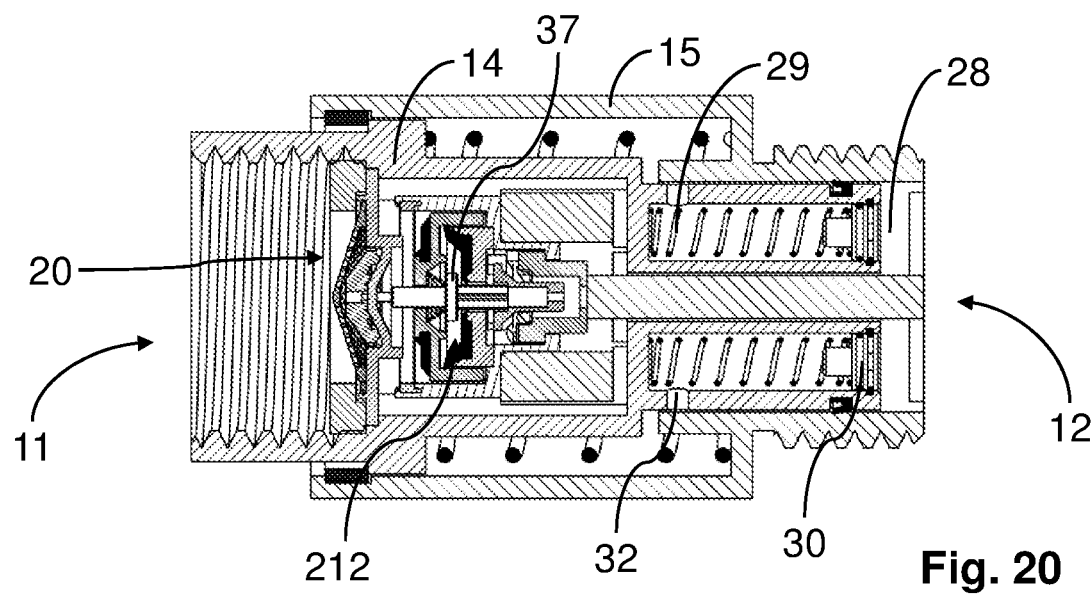
FIG. 20 shows the fast switch FIG. 19 after the end of the second actuating step.
Figure 24:
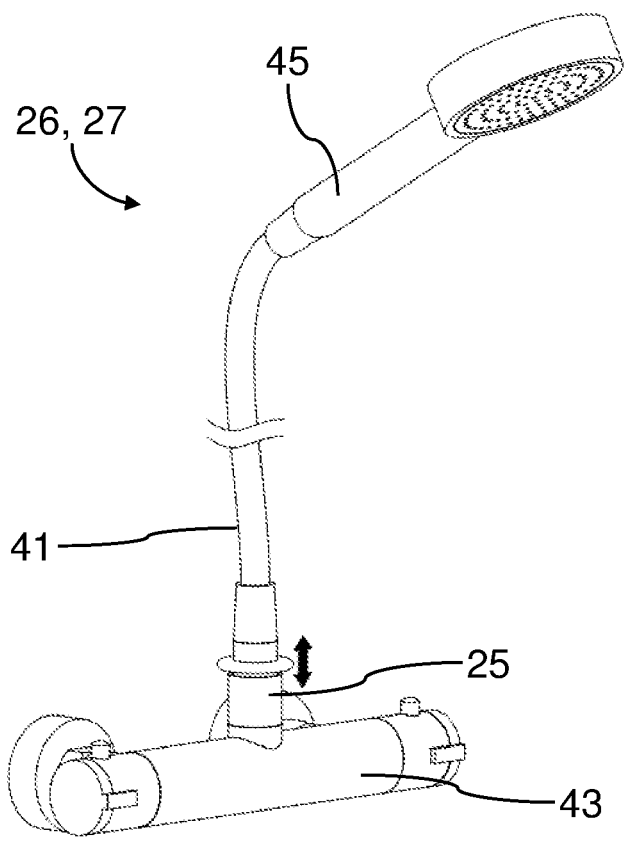
FIG. 24 shows a further sanitary device with a fast switch according to the invention.
Figure 25:
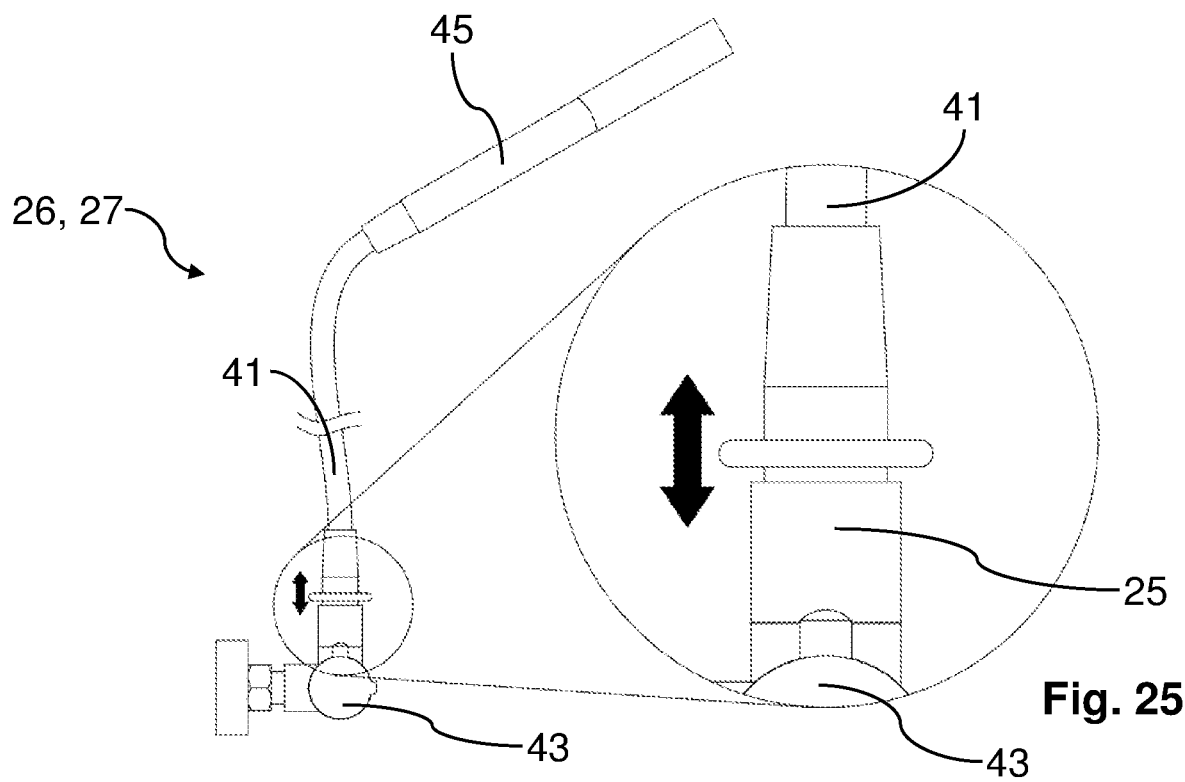
FIG. 25 shows the sanitary device from FIG. 24 in a side view with a detail enlargement.

The situation shown in FIG. 20 now arises, in which the valve body 20 is open so that water can flow from the water inlet end 11 to the water outlet end 12.

FIGS. 21-23, and 24-25 show two exemplary embodiments of a sanitary device 20 in the form of a shower device 27 with a fast switch 25 according to the invention.

Since the shower head 45 constitutes a flow obstacle, the water pipeline 41 and hence the water outlet end 12 are not pressure-free, but a certain operating pressure prevails when the fitting 43 is opened.

This requires the fast switch 25 to have a balancing volume 28 of the type described.

The description above refers only to the preferred exemplary embodiments and in no way restricts the present invention. Although the present invention has already been described with the preferred exemplary embodiments presented above, these do not restrict the present invention. The person skilled in the art with the usual knowledge in this field should be able, by means of the above-disclosed technical content, to make some changes or modifications as equivalent exemplary embodiments of the equivalent changes, without deviating from the technical solution of the present invention. All simple variations, equivalent changes and modifications made on the basis of the technical essence of the present invention for the above exemplary embodiments, without deviating from the content of the technical solution of the present invention, should be regarded as covered by the scope of the technical solution of the present invention.

LIST OF REFERENCE SIGNS

A: Water source
B: Water outlet apparatus
10: Tube body
11: Water inlet end
12: Water outlet end
13: Pressing piece
14: First pipe
141: First contact face
142: Step surface
143: Internal thread
15: Second pipe
151: Second contact face
152: Inner ring groove
153: External thread
16: Elastic component
17: Stop element
20: Valve body
21: Chamber base
211: Outer chamber
212: Inner chamber
213: Connecting channel
22: Blocking element
23: Switching component
24: Switch element
25: Fast switch
26: Sanitary device
27: Shower device
28: Balancing volume
29: Return element
30: Piston
31: Rear side of 30
32: Vent opening
33: Outer wall
34: Inner wall
35: Bistable mechanism
36: Side face
37: Pilot valve
38: Inner chamber wall
39: Valve seat
40: Outlet
41: Water pipeline
42: Wall connection
43: Fitting
44: Washbasin fitting
45: Shower head
46: Counter-switch element

The invention claimed is:

1. A fast switch (25) for a sanitary device (26), said fast switch being configured to connect a water source (A) and a water outlet apparatus (B), the fast switch (25) comprises:
　a tube body (10), comprising
　　a water inlet end (11) configured for connection to the water source (A),
　　a water outlet end (12) configured for connection to the water outlet apparatus (B), wherein the water outlet end (12) and the water inlet end (11) are able to approach or move away from one another,
　　a pressing piece (13) arranged on the water outlet end (12) and moves with the water outlet end (12); and
　a valve body (20) arranged in the tube body (10) that establishes at least two fluidic switching states between the water inlet end (11) and the water outlet end (12), the valve body (20) comprises a switch element (24), wherein the pressing piece (13) of the tube body (10) is configured to press the switch element (24) of the valve body (20) by the mutual approach of the water inlet end (11) and the water outlet end (12) such that the valve body (20) is switched in order to selectively set one of the at least two fluidic switching states between the water inlet end (11) and the water outlet end (12), wherein the valve body (20) further comprises a switching component (23) configured to actuate a pilot valve (37) of an inner chamber (212).

2. The fast switch (25) as claimed in claim 1, wherein one of the at least two fluidic switching states comprises a blocking fluidic switching state which blocks a water flow between the water inlet end (11) and the water outlet end (12).

3. The fast switch (25) as claimed in claim 1, wherein a changeable balancing volume (28) defined by a piston (30) is formed downstream of the valve body (20).

4. The fast switch (25) as claimed in claim 1, wherein the tube body (10) further comprises:
　a first pipe (14), the water inlet end (11) is formed at one end of the first pipe (14) and the valve body (20) is arranged in the first pipe (14); and
　a second pipe (15), the water outlet end (12) is formed at one end of the second pipe (15) and the second pipe (15) is placed movably about the first pipe (14), so that the water outlet end (12) and the water inlet end (11) can approach or move away from one another.

5. The fast switch (25) as claimed in claim 4, wherein
　an outer wall (33) of the first pipe (14) comprises a first contact face (141) which faces the water outlet end (12);
　an inner wall (34) of the second pipe (15) comprises a second contact face (151) which faces the water inlet end (11); and the valve body (20) further comprises an elastic component (16) which lies between the first contact face (141) and the second contact face (151) and is configured to bias the water inlet end (11) and the water outlet end (12) away from one another.

6. The fast switch (25) as claimed in claim 4, wherein
an outer wall (33) of the first pipe (14) has a step surface (142) which faces the water inlet end (11);
an inner wall (34) of the second pipe (15) has an inner ring groove (152) which is formed at the other end of the second pipe (15) opposite the water outlet end (12);
the valve body (20) further comprises a stop element (17) arranged in the inner ring groove (152) that protrudes from the inner ring groove (152); and
the step surface (142) lies selectively on a side face (36) of the stop element (17) so that the stop element (17) is configured to delimit a maximum distance between the water inlet end (11) and the water outlet end (12).

7. The fast switch (25) as claimed in claim 2, wherein
an internal thread (143) is formed on an inner wall (34) or inner wall surface of the water inlet end (11);
and an external thread (153) is formed on an outer wall (33) or outer wall surface of the water outlet end (12).

8. The fast switch (25) as claimed in claim 1, wherein the valve body (20) further comprises
a chamber base (21), comprising
an outer chamber (211) connected to the water inlet end (11),
an inner chamber (212) connected to the outer chamber (211), and
a connecting channel (213) connected to the inner chamber (212) and to the water outlet end (12), wherein the water from the water source (A) is only configured to flow to the water outlet end (12) successively through the water inlet end (11), the outer chamber (211), the inner chamber (212) and the connecting channel (213); and
a blocking element (22), which is flexible and lies selectively on the chamber base (21) and blocks the outer chamber (211) and the inner chamber (212), so that the valve body (20) is configured to block or connect the water inlet end (11) and the water outlet end (12).

9. The fast switch (25) as claimed in claim 8, wherein the switching component (23), comprises:
a closed state in which, when the switching component (23) is in the closed state, the switching component (23) presses against the blocking element (22) so that the blocking element (22) lies on the chamber base (21) and blocks the outer chamber (211) and the inner chamber (212); and
an open state in which, when the switching component (23) is in the open state, the switching component (23) releases the blocking element (22) so that the blocking element (22), by a flexibility thereof, is separable from the chamber base (21), whereby the outer chamber (211) and the inner chamber (212) are connected, and
the switch element (24) of the valve body (20) is connected to the switching component (23), and, when the switch element (24) is pressed by the pressing piece (13) of the tube body (10), the switch element (24) causes the switching component (23) to be switched between the closed state and the open state.

10. The fast switch (25) as claimed in claim 1, wherein a connecting thread is formed at least one of the water inlet end (11) or at the water outlet end (12).

11. The fast switch (25) as claimed in claim 1, wherein the switching component (23) comprises a bi-stable mechanism (35).

12. The fast switch (25) as claimed in claim 1, wherein a low-pressure side is configured at the water outlet end (12).

13. The fast switch (25) as claimed in claim 1, wherein one of the at least two fluidic switching states comprises a connecting fluidic switching state of the at least two fluidic switching states allows a water flow between the water inlet end (11) and the water outlet end (12).

14. The fast switch (25) as claimed in claim 3, wherein the balancing volume (28) is at least as large as a water volume displaced on a change of the switching state.

15. The fast switch (25) as claimed in claim 3, wherein the balancing volume (28) has the piston (30) which is at least one of biased with a return element (29) or open at the rear against ambient pressure.

16. The fast switch (25) as claimed in claim 1, further comprising at least one of a flow limiter, a flow reducer, or a shut-off valve is arranged downstream of the water outlet end (12).

17. A fast switch for a sanitary device, the fast switch being configured to connect a water source and a water outlet apparatus, the fast switch comprising:
a tube body comprising
a water inlet end configured for connection to the water source,
a water outlet end configured for connection to the water outlet apparatus, wherein the water outlet end and the water inlet end are able to approach or move away from one another, and
a pressing piece arranged on the water outlet end and moves with the water outlet end; and
a valve body arranged in the tube body that establishes at least two fluidic switching states between the water inlet end and the water outlet end of the tube body, the valve body comprising a switch element, wherein the pressing piece of the tube body is configured to press the switch element of the valve body by a mutual approach of the water inlet end and the water outlet end of the tube body such that the valve body is switched in order to selectively set one of the at least two fluidic switching states between the water inlet end and the water outlet end of the tube body, wherein the valve body further comprises:
a chamber base, comprising
an outer chamber connected to the water inlet end,
an inner chamber connected to the outer chamber, and
a connecting channel connected to the inner chamber and to the water outlet end, wherein the water from the water source is only configured to flow to the water outlet end successively through the water inlet end, the outer chamber, the inner chamber and the connecting channel; and
a blocking element, which is flexible and lies selectively on the chamber base and blocks the outer chamber and the inner chamber, so that the valve body is configured to block or connect the water inlet end and the water outlet end.

18. The fast switch of claim 17, wherein the valve body further comprises:
a switching component comprising:
a closed state in which, when the switching component is in the closed state, the switching component presses against the blocking element so that the blocking element lies on the chamber base and blocks the outer chamber and the inner chamber; and an open state in which, when the switching component is in the open state, the switching component releases the blocking element so that the blocking element, by a flexibility thereof, is separable from the chamber base, whereby the outer chamber and the inner chamber are connected, wherein the switch element of the valve body is connected to the switching component, and, when the switch element is pressed by the pressing piece of the tube body, the switch element causes the switching component to be switched between the closed state and the open state.

19. A fast switch for a sanitary device, the fast switch being configured to connect a water source and a water outlet apparatus, the fast switch comprising:

a tube body comprising
   a water inlet end configured for connection to the water source,
   a water outlet end configured for connection to the water outlet apparatus, wherein the water outlet end and the water inlet end are able to approach or move away from one another, and
   a pressing piece arranged on the water outlet end and moves with the water outlet end; and a valve body arranged in the tube body that establishes at least two fluidic switching states between the water inlet end and the water outlet end of the tube body, the valve body comprising a switch element, wherein the pressing piece of the tube body is configured to press the switch element of the valve body by a mutual approach of the water inlet end and the water outlet end of the tube body such that the valve body is switched in order to selectively set one of the at least two fluidic switching states between the water inlet end and the water outlet end of the tube body, wherein the tube body further comprises:
   a first pipe, the water inlet end is formed at one end of the first pipe and the valve body is arranged in the first pipe; and
   a second pipe, the water outlet end is formed at one end of the second pipe and the second pipe is placed movably about the first pipe, so that the water outlet end and the water inlet end can approach or move away from one another, and wherein:
   an outer wall of the first pipe comprises a first contact face which faces the water outlet end;
   an inner wall of the second pipe comprises a second contact face which faces the water inlet end; and
   the valve body further comprises an elastic component which lies between the first contact face and the second contact face and is configured to bias the water inlet end and the water outlet end away from one another.

\* \* \* \* \*